C. E. REED.
REVOLVING CUTTER ROTARY BORING DRILL.
APPLICATION FILED FEB. 26, 1915.
1,159,088.
Patented Nov. 2, 1915.
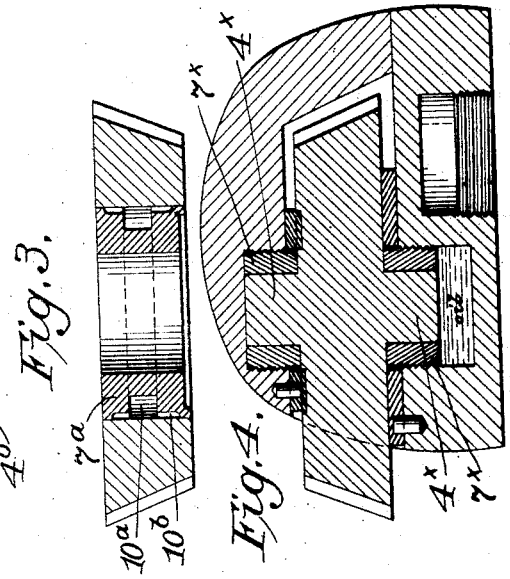
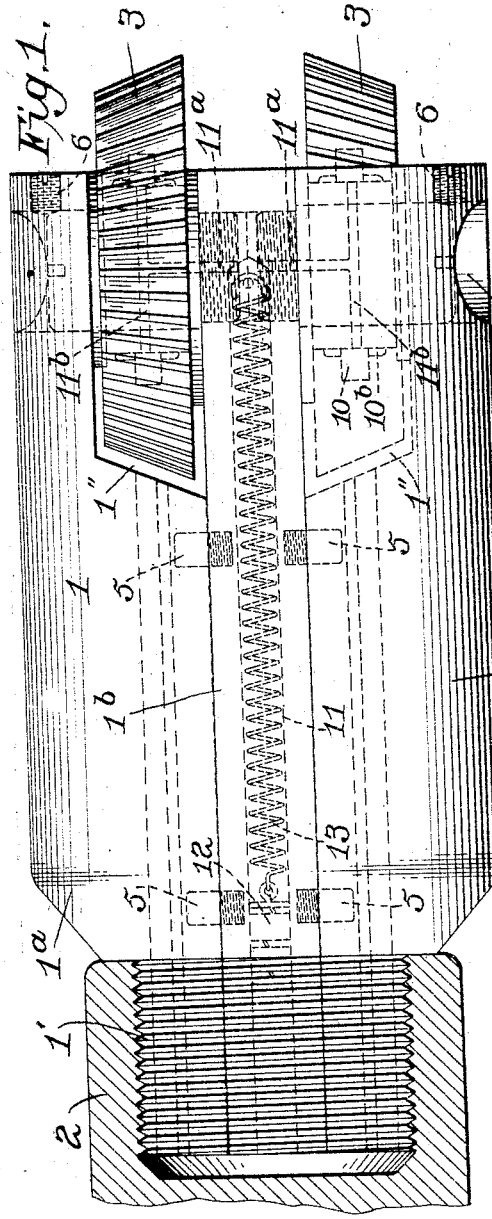
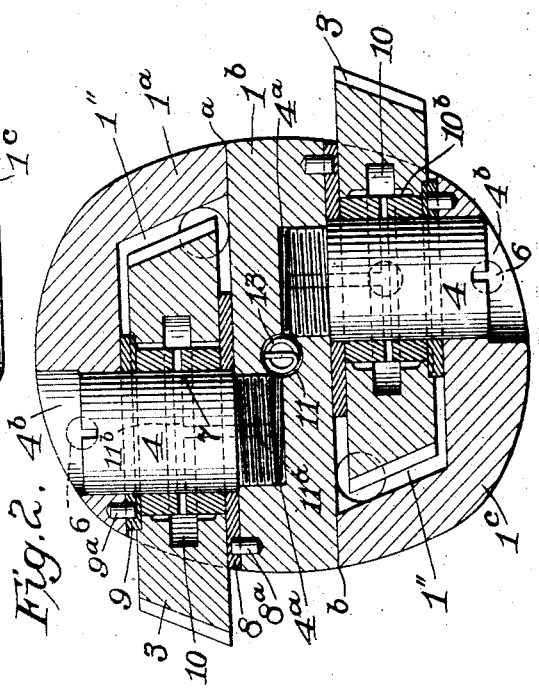
Attest:
Ewd R. Tolson,
B. L. Bishop.
Inventor:
Clarence E. Reed,
by Mason, Middleton, Donaldson & Spear
Attys.

UNITED STATES PATENT OFFICE.

CLARENCE E. REED, OF HOUSTON, TEXAS.

REVOLVING-CUTTER ROTARY BORING-DRILL.

1,159,088.

Specification of Letters Patent. Patented Nov. 2, 1915.

Application filed February 26, 1915. Serial No. 10,769.

*To all whom it may concern:*

Be it known that I, CLARENCE E. REED, a citizen of the United States, residing at Houston, Texas, have invented certain new and useful Improvements in Revolving-Cutter Rotary Boring-Drills, of which the following is a specification.

My present invention relates to improvements in rotary boring drills of that type which are provided with cutters of circular plate or disk shape.

Among the objects of the invention are to provide a simple, durable and efficient construction capable of being economically manufactured and the parts readily assembled. I have also aimed to provide efficient lubricating means for lubricating the bearings of the cutters.

With these and other objects in view, the invention includes the novel features of construction and arrangement of parts as defined by the appended claims, my invention being more particularly described hereinafter with reference to the accompanying drawings, in which—

Figure 1 is a side elevation of a drill head; Fig. 2 is a transverse section through the bushing carrying the cutters; and Figs. 3 and 4 are sectional views illustrating modifications.

Referring by reference characters to this drawing, the numeral 1 designates the head which has a contracted upper end 1' which is threaded for connection with the tubular drill stem or operating member 2. Within this head are mounted the cutters 3 journaled on pins or bushings 4, these cutters being located in parallel planes parallel to the longitudinal axis of the drill head, and located in recesses 1'' in the cutter head, from which they project on opposite sides, as clearly shown in Fig. 2.

To facilitate the manufacture of the head and the assembling of the parts, I form the head in sections separated from each other along longitudinal lines. I preferably make the head of three sections, indicated respectively at $1^a$, $1^b$ and $1^c$ abutting against each other along longitudinal lines $a$ and $b$, and clamped together by the portion of the tubular drill rod 2 which is threaded upon the shank $1^a$. Alinement of the respective parts is effected by the dowel pins 5, and also by the bushings 4.

The recesses 1'' for the cutters are preferably formed in the inner faces of the outer sections $1^a$ and $1^c$. Recesses $4^a$ are provided in the inner member or section $1^b$ for the inner ends of the bushings 4, which recesses may be threaded, as shown, to receive corresponding threads formed on the inner ends of the bushings. The outer sections of the drill head are provided with recesses $4^b$ to receive the opposite ends of the bushings, and these recesses may, as shown in Fig. 2, extend clear through the sections, so that, the bushings being provided with kerfs in their outer ends for the reception of a screw driver, said bushings may be inserted or removed without disassembling the head. If preferred, however, the outer ends of the recesses might be closed, in which event the bushings would be first secured into the inner member $1^b$, and the outer members or sections $1^a$ and $1^c$ subsequently slipped over the bushings with their assembled cutters.

Where the bushing recesses $4^b$ open to the exterior of the drill head, as shown in Fig. 1, I prefer to provide locking pins or screws for locking the bushings in position, as indicated at 6. I prefer to surround the bushing pins 4 with bearing rings or sleeves 7 upon which the cutters rotate, and provide on opposite faces of the cutters the wear plates 8 and 9 which may be prevented from rotation with relation to the head by the dowel pins $8^a$ and $9^a$.

The matter of lubricating these cutters is a very important one, owing to the conditions under which they operate, and I secure effective lubrication by providing annular grooves or channels which may be packed with grease. Such grooves or channels may be formed by coring out sufficiently the interior of the cutters, as indicated at 10, or by making the bushing sleeve $7^a$ (Fig. 3) thicker and forming a recess $10^a$ in the bushing, in either case smaller transverse grooves being provided at intervals, as indicated at $10^b$. Such lubricating channels, when packed with grease will, under ordinary conditions, be found to be sufficient, but in order to make the drill head run longer without repacking the cutter bearings, I may provide the central member $1^b$ of the cutter head with a longitudinal grease chamber 11 communicating by passages $11^a$ and $11^b$ with the passage 10. Within this chamber 11 would be provided a plunger 12 which, under the action of a spring 13, would tend to force the grease through the passages 11ᵃ and 11ᵇ, this spring and plunger being removable for the purpose of refilling the chamber 11.

Instead of having the cutters formed with independent bushing pins, as shown in Fig. 2, I may form the cutters with integral bearing projections from opposite sides, as indicated at 4ˣ in Fig. 4, which bearing projections would be surrounded by the sleeves or bushings 7ˣ which, if desired, can be threaded into the recesses formed in the walls of the head sections.

Having thus described my invention what I claim is:

1. In a rotary boring drill, a head comprising three sections united on longitudinal lines, said outer sections having their inner faces recessed to form recesses open only at one side and at the bottom, said central and outer sections having further recesses to receive cutter journals, and circular cutters journaled in said first recesses.

2. In a rotary boring drill, a head comprising a plurality of sections joined on longitudinal lines and detachably connected together, said cutter head having cutter receiving recesses formed in the inner faces of the outer head sections, said recesses being arranged parallel to the longitudinal axis of the cutter head and each of said recesses being open only at one side and at the bottom and circular cutters journaled therein.

3. A rotary boring drill comprising a head formed of a plurality of sections with means for securing them together, said head having cutter receiving recesses at the points of separation between the sections, said recesses each being open only at the bottom and at one side, bearing pins having their ends seated in the walls of said recesses, and circular cutters journaled on said pins and projecting from said recesses.

4. A rotary boring drill comprising a plurality of sections joined on longitudinal lines and detachably connected together, said cutter head having oppositely opening cutter-receiving recesses, said recesses each being open only at one side and at the bottom, bearing pins having their ends detachably connected with adjoining sections, and rotary cutters journaled on said pins.

5. In a rotary boring drill, a head comprising three sections united on longitudinal lines, said outer sections having their faces recessed to receive cutters, and said central and outer sections having sets of opposed recesses, each of said cutter receiving recesses being open only at one side and at the bottom, bearing pins having their inner ends threaded to engage the recesses in the inner member and their outer ends detachably seated in the recesses in the outer member, and circular cutters rotating on said bearing pins.

In testimony whereof, I affix my signature in presence of two witnesses.

CLARENCE E. REED.

Witnesses:
JAMES M. SHEA,
BENNETT S. JONES.